United States Patent Office 3,093,473
Patented June 11, 1963

3,093,473
COMPOSITION AND METHOD FOR KILLING A GRASS, SUCH AS CRAB GRASS
Paul F. Warner and Bradford L. Archer, Phillips, Tex., assignors to Phillips Petroleum Company, a corporation of Delaware
No Drawing. Original application Aug. 20, 1959, Ser. No. 834,943, now Patent No. 2,993,923, dated July 25, 1961. Divided and this application Mar. 14, 1961, Ser. No. 95,502
6 Claims. (Cl. 71—2.7)

This invention relates to selective herbicides. In one of its aspects, the invention provides a herbicide containing cuprous tertiarybutyl sulfonium chloride. In another of its aspects, the invention provides a selective herbicide, for example, to kill crab grass in a Bermuda lawn, said herbicide comprising essentially cuprous tertiarybutyl sulfonium chloride. In another of its aspects, the invention provides a highly effective composition of cuprous tertiarybutyl sulfonium chloride and an aromatic extract oil, for example, as can be obtained by the sulfur dioxide extraction of catalytically cracked gas-oil, said composition being particularly effective to kill crab grass in Bermuda lawns.

This application is a divisional application of Serial Number 834,943, filed August 20, 1959, now Patent No. 2,993,923, in which there is disclosed and claimed a method for the preparation of cuprous tertiarybutyl sulfonium chloride which comprises reacting together cuprous chloride and ditertiarybutyl sulfide. Also disclosed in said application is cuprous tertiarybutyl sulfonium chloride.

We have now found that the cuprous chloride addition compound of ditertiarybutyl sulfide, that is, cuprous tertiarybutyl sulfonium chloride, is a selective herbicide for killing crab grass in a Bermuda grass lawn. Thus, in tests conducted on one square yard plots of grass, crab grass was completely killed as soon as about eleven days after application. Bermuda grass, which is somewhat injured, at times, is found to recover rapidly.

It is an object of this invention to provide a herbicide. It is a further object of this invention to provide a selective herbicide. It is a further object still of this invention to provide a compound which will kill crab grass in a Bermuda grass lawn. It is a further object still of this invention to provide a composition which is particularly effective to kill crab grass in a Bermuda grass lawn.

Other aspects, objects, and the several advantages of this invention are apparent from a study of this disclosure and the appended claims.

According to the invention, there is provided a method for selectively killing an undesired grass, such as crab grass in a lawn, such as a Bermuda lawn, which comprises applying to the same a quantity effective to kill said undesired grass of cuprous chloride addition product of ditertiarybutyl sulfide. Still further, according to the invention, there is provided a composition for killing crab grass, said composition comprising essentially cuprous chloride addition compound of ditertiarybutyl sulfide. Still further, according to the invention, there is provided a preferred composition of highly desired properties and particularly effective for killing crab grass in a Bermuda grass lawn, said composition comprising the cuprous chloride addition compound of ditertiarybutyl sulfide and an extract oil obtained by the sulfur dioxide extraction of a catalytically cracked gas-oil.

Cuprous tertiarybutyl sulfonium chloride was prepared by reacting cuprous chloride with an excess of ditertiarybutyl sulfide (1 mol to 2). The product was only partially soluble in the excess sulfide. No diluent was used and the reaction occurred satisfactorily at room temperature. The reaction is mildly exothermic. In one run, 99 grams of cuprous chloride was added to 292 grams of ditertiarybutyl sulfide in a beaker and let stand overnight. The next day, 180 grams, 74 mol percent yield based on cuprous chloride, was recovered by filtration. The product was washed with acetone. It is a green powder with an odor somewhat like that of camphor; it is quite repellent to water and appears to have very little solubility in it.

In the tests, later described, 90 percent by volume of cuprous tertiarybutyl sulfonium chloride was ground with 10 percent by volume of a mixture of 50 percent Triton X-171 and 50 percent Triton B-1956 and suspended in water to give a concentration of 1 to 2 grams of cuprous tertiarybutyl sulfonium chloride per pint of water and applied at the rate of 10 to 20 pounds of cuprous tertiarybutyl sulfonium chloride per acre to Bermuda crab grass plots. Part of the crab grass (50 percent) was killed but the results were definitely inferior to those obtained when sulfur dioxide extract oil was used (100 percent of the crab grass was killed).

The extract oil will not kill crab grass nor injure it appreciably when applied at the concentrations used in these tests. Its function in the spray formulation appears to be more that of an aid to leaf wetting and leaf penetration than as a herbicide. All leaves are covered with a waxy layer which the oil appears to penetrate well permitting the herbicide to be effective.

Other oils can be substituted for the $SO_2$ extract oil. Aromatic oils are now preferred because of their superior solvency for wax. Also, the aromatic are highly phytotoxic. Benzene, toluene, xylene, and heavier aromatics are quite satisfactory. We have used DAC (debutanized aromatic concentrate) in some formulations with good results. DAC is approximately 50 percent benzene and toluene; it also contains many other compounds of an aromatic nature such as dicyclopentadiene and homologs. The concentrate here discussed is further identified and characterized in, for example, U.S. Patent 2,848,522, issued August 19, 1958, to Forrest E. Gilmore. Thus, DAC can be obtained from a cracking zone, usually from the cracking of butane, but can be obtained from the cracking of propane and/or ethane. Suffice to say here, DAC is a $C_5$ and heavier fraction, mainly aromatics and diolefins.

The sulfur dioxide extraction can be practiced upon a gas-oil fraction which is obtained from the catalytically cracking of, say, a heavy gas-oil. It can also be obtained from other cracking operations as is well known in the art of cracking oils. Essentially, the sulfur dioxide extraction oil is an oil which is aromatic in character and has a boiling point range of from about 550° F. to about 900° F.

The following data serve to illustrate reduction to practice of the several aspects of the invention:

| Formula | A | B | I | II | III | IV |
|---|---|---|---|---|---|---|
| Cuprous tertiarybutyl sulfonium chloride, g | 1 | 2 | 1 | 2 | 3 | 4 |
| Triton B-1956, g | 2 | 2 | | | | |
| Triton X-171, g | 10 | 10 | 0.5 | 0.5 | 0.5 | 0.5 |
| $SO_2$ extract oil, ml | 10 | 10 | 10 | 10 | 10 | 10 |
| Ammonium nitrate, g | | | 1.0 | 2.0 | 3.0 | 4.0 |
| Water, ml | 500 | 500 | 500 | 500 | 500 | 500 |
| Application rate,[1] lb./acre approx | 10 | 20 | 10 | 20 | 30 | 40 |
| Effectiveness,[2] percent of crab grass killed | 100 | 100 | 70 | 90 | 100 | 100 |
| Condition of Bermuda grass | Good | Good | Good | Good | Good | Good |

[1] Cuprous tertiarybutyl sulfonium chloride.
[2] Eleven days after application.

Though now preferred in the composition of the invention, it is not absolutely necessary to use a dispersing agent as was used in the examples.

When cuprous tertiarybutyl sulfonium chloride was tested in other formulations than those which contained the $SO_2$ extract oil, the desired effects, though obtained, were inferior to those obtained with compositions containing the $SO_2$ extract oil. Therefore, the now preferred embodiment of the invention is that which is a composition or method embodying the $SO_2$ extract oil.

Generally, the application of the cuprous tertiarybutyl sulfonium chloride is effected at 5–50 pounds per acre. Presently, the rate of from about 10 to about 40 pounds per acre is preferred. For good results, at least 5 pounds per acre should be employed. However, in some instances, a smaller quantity of the chloride per acre, depending upon the season, can be used to obtain the results falling within the scope of the invention. These would not, however, be preferred results.

When $SO_2$ extract oil is used, it will be present in a formulation in an amount in the approximate range of 1–20 milliliters for each 0.5–10 grams of the cuprous tertiarybutyl sulfonium chloride in the composition.

It is within the scope of the invention to include ammonium nitrate in the composition. The ammonium nitrate appears to aid in the rapid restablishment of the desired grass when it has been injured.

Ammonium nitrate is not necessary to the formulation. It does seem to enhance the herbicidal properties of the other ingredients, however. We have tested it at much higher concentrations than were used here. It is totally ineffective as a herbicide by itself. Its chief value appears to be that it gives the uninjured and slightly injured Bermuda grass a boost and aids in its recovery from the spray treatment.

Triton X–171 and Triton B–1956 are emulsifiers manufactured and recommended by the Rohm and Haas Company for use in preparing spray formulations. Triton X–171 is said to be a blend of alkyl aryl polyether alcohols with organic sulfonates. Triton B–1956 is said to be 77 percent modified phthalic glycerol alkyd resin dissolved in ethylene dichloride, and it is described in Rohm and Haas Company Bulletin AG–60, November 1955. Similarly, Triton B–1956 is described in Rohm and Haas Bulletin SAN–432–2 of November 1956. Other dispersing agents can be used.

The foregoing U.S. Patent 2,848,522 described and claims a process which comprises subjecting a normally gaseous hydrocarbon to cracking to obtain a composite product comprising hydrogen and $C_1$ to $C_5$ olefins and paraffins together with minor amounts of readily polymerizable aromatic and unsaturated impurities; cooling said composite product to a temperature such that the cracking reaction ceases; removing oil-insoluble impurities from said composite product; subjecting said product to refrigeration at a temperature in the range 40 to 70° F. and at a pressure in the range 115 to 125 p.s.i.g., whereby a gaseous phase and a liquid phase are obtained; recovering from said gaseous phase a $C_3$–$C_4$ fraction, a $C_2$ fraction, and a fraction comprising methane and hydrogen; and recovering from said liquid phase a $C_4$ and lighter fraction and a $C_5$ and heavier fraction containing substantially all of said readily polymerizable impurities.

It is from this process that DAC, discussed herein, is now preferably obtained.

Reasonable variation and modification are possible within the scope of the foregoing disclosure and the appended claims to the invention, the essence of which is that the cuprous chloride addition compound of dietertiarybutyl sulfide has been found to be a herbicide, more particularly a selective herbicide, and still more particularly a herbicide for killing crab grass in a Bermuda grass lawn, and further, that a combination of said addition compound together with an $SO_2$ extract oil, derived as herein described, or by an equivalent method, has been found particularly effective as a herbicidal composition and particularly suited to the killing of crab grass in a Bermuda grass lawn.

We claim:

1. A method for selectively killing crab grass which comprises applying to the same a quantity effective to kill the same of cuprous chloride addition product of ditertiarybutyl sulfide.

2. A method for removing crab grass from a growing Bermuda grass lawn which comprises treating the area containing said crab grass with a quantity effective to kill said crab grass of cuprous chloride addition product of ditertiarybutyl sulfide.

3. A method of killing an undesired grass which comprises applying to said grass cuprous tertiarybutyl sulfonium chloride in a quantity of sufficient to kill said grass.

4. A method of killing crab grass in a lawn which comprises treating said lawn with 5–50 pounds per acre of cuprous tertiarybutyl sulfonium chloride.

5. A method of killing crab grass in a Bermuda grass lawn which comprises applying to said lawn a formulation of cuprous tertiarybutyl sulfonium chloride and an aromatic oil obtained by sulfur dioxide extraction of a cracked gas-oil, the cuprous tertiarybutyl sulfonium chloride being present in said formulation in an amount in the range 0.5–10 grams and the extract oil being present in an amount in the range 1–20 milliliters, the formulation being applied dispersed in water in a manner and quantity sufficient to kill only said crab grass.

6. A composition of cuprous tertiarybutyl sulfonium chloride and an aromatic extract oil obtained by sulfur dioxide extraction of a gas-oil obtained by catalytic cracking of a hydrocarbon oil said composition containing the cuprous tertiarybutyl sulfonium chloride in an amount sufficient that upon application to kill crab grass there is formed an effective herbicide.

References Cited in the file of this patent

UNITED STATES PATENTS

| | | |
|---|---|---|
| 2,083,065 | Heyl | June 8, 1937 |
| 2,472,347 | Sexton | June 7, 1949 |
| 2,651,649 | Tuwiner | Sept. 8, 1953 |
| 2,854,791 | Antognini | Oct. 7, 1958 |

OTHER REFERENCES

"Plant Regulators," CBCC Positive Data Series No. 2, June 1955, Publication No. 384, National Academy of Sciences, National Research Council, pages A–C, 1 and 43.